(12) United States Patent
Miller et al.

(10) Patent No.: US 6,175,101 B1
(45) Date of Patent: Jan. 16, 2001

(54) THERMOPLASTIC MATERIAL MELTING UNIT HAVING HIGH THROUGHPUT AND HEATING CAPACITY

(75) Inventors: Scott R. Miller, Roswell; Laurence B. Saidman, Duluth; Brian Betkowski, Atlanta; Christian B. Cook, Snellville, all of GA (US); Mark H. Farley, LaGuna Niguel, CA (US)

(73) Assignee: Nordson Corporation, Westlake, OH (US)

( * ) Notice: Under 35 U.S.C. 154(b), the term of this patent shall be extended for 0 days.

(21) Appl. No.: 09/159,448

(22) Filed: Sep. 24, 1998

(51) Int. Cl.⁷ .............................. B05C 5/04; B29B 13/02; B67D 5/62
(52) U.S. Cl. ................... 219/422; 219/540; 222/146.5
(58) Field of Search .................................. 219/422, 420, 219/426, 530, 540; 222/146.5

(56) References Cited

U.S. PATENT DOCUMENTS

| | | | |
|---|---|---|---|
| 3,531,023 | * 9/1970 | Mercer | 222/146.5 |
| 4,667,850 | * 5/1987 | Scholl et al. | 222/146.5 |
| 4,771,920 | 9/1988 | Boccagno et al. | 222/146.5 |
| 4,850,425 | * 7/1989 | Anderson | 222/146.1 |
| 5,657,904 | 8/1997 | Frates et al. | 222/146.5 |

FOREIGN PATENT DOCUMENTS

| | | |
|---|---|---|
| 8805907 | 3/1989 | (DE) . |
| 2221253 | 10/1974 | (FR) . |
| 1223674 | 3/1971 | (GB) . |
| 6-154692 | * 6/1994 | (JP) . |

* cited by examiner

*Primary Examiner*—Joseph Pelham
(74) *Attorney, Agent, or Firm*—Wood, Herron & Evans, L.L.P.

(57) ABSTRACT

A thermoplastic material melting unit including various grid and reservoir configurations designed, for example, to optimize flow rate, melt rate and residence time within a melting unit. A main embodiment includes a supply hopper connected with a liquid reservoir having a plurality of heat exchanging elements, such as fins extending upward from its bottom wall. A melting grid is generally disposed between the supply hopper and the reservoir and includes both upwardly and downwardly extending heated fins. The downwardly extending fins intermesh with the upwardly extending fins of the reservoir. Additional embodiments of melting grids and heat exchange devices for melting solid thermoplastic material include bare element configurations, angled fin configurations and slotted fin configurations.

27 Claims, 11 Drawing Sheets

THERMOPLASTIC MATERIAL MELTING UNIT HAVING HIGH THROUGHPUT AND HEATING CAPACITY

FIELD OF THE INVENTION

The present invention relates generally to devices used in connection with melting and dispensing thermoplastic materials and, more particularly, to melting units including grids and reservoirs used for melting and dispensing hot melt adhesive.

BACKGROUND OF THE INVENTION

So-called hot melt adhesives are used for various coating and bonding operations such as diaper construction, package forming, automobile parts assembly and various other industrial applications. Generally, it is convenient to store and ship the hot melt adhesive materials in bulk forms such as in the form of chicklets, slats, pellets, bricks or slugs held in containers. In any of these cases, important parameters include the ability to achieve a desired throughput or flow rate of liquid adhesive from the unit and, at the same time, achieve and maintain a relatively precise elevated liquid temperature. This temperature is often referred to as the set point temperature.

Hopper-type melting units may be used to melt and dispense many forms of thermoplastic adhesives including the forms mentioned above. In the case of bulk adhesive in the form of a slug held in a container, hopper-type dispensers or melting units can first remove the slug from the container and then melt the slug of adhesive as it contacts a heated melting grid mounted near the bottom of the hopper. The other forms of adhesive mentioned above may simply be loaded into the hopper. In each case, a heated reservoir is usually disposed beneath the melting grid to receive the fully or partially melted hot melt adhesive as it passes through the grid. Reservoirs have been designed to maintain the adhesive in a heated liquid state suitable for the application and, for this purpose, various types of fins or other heated surfaces have been provided in the reservoir. An outlet of the reservoir typically leads to a pump and heated manifold assembly for pumping the hot melt adhesive to a dispenser appropriate for the application.

Melting grids have been the primary devices for transforming the adhesive from its initial form into a molten or at least semi-molten state. Melting grids may consist of various forms of heated grid members that melt the adhesive on contact. These members are typically elongated fins. Melting grids typically include through passages for the melted adhesive. Preferred grids take the form of aluminum castings with electrical heating elements cast within the grid structure. This maximizes the service life of the heaters and provides the most uniform temperatures at a reasonable cost. Melting grids must be designed to compromise between a number of competing objectives. The primary factors that can be varied to meet these objectives are fin thickness and fin spacing. Fin height is also a factor, but the overall size of the unit and the constraints of casting technology typically limit height.

Thin fins are preferred to maximize the surface area in contact with the adhesive. However, a minimum thickness is required in the vicinity of the heater to allow for variability of the heater location within the casting and variability in the size of the heater itself. A minimum thickness is also required for strength in large units. Thus, the fins are tapered from a relatively thick section near the heater to a relatively thin tip. However, if the taper is too gradual or the fin is too high, the tip will be much cooler than the heater and this will adversely affect the ability to melt adhesive.

Widely spaced fins have been preferred to maximize the cutting force on the solid adhesive and minimize the resistance to flow as the adhesive melts. However, if the fins are spaced too widely, solid adhesive will be able to pass through without melting. Also, widely spacing the fins results in fewer overall fins in a given size grid, and thus less surface area for transferring heat to the adhesive.

Finally, melting units have generally provided a significant space within the reservoir for liquid adhesive to accumulate to meet high instantaneous demand. This is a problem because much of the liquid adhesive ends up spaced a significant distance from the nearest heated surface. The liquid adhesive is therefore difficult to heat to a desired temperature. The fact that hot melt adhesive is a poor heat conductor exacerbates this problem. Its relatively high viscosity precludes significant convective heat transfer as well. Also, in start-up conditions, this adhesive is often in a solid state and must be slowly melted and heated to its set point temperature prior to using the unit.

One way to drive more heat into the adhesive would be to heat the melting elements, such as fins, to a temperature substantially above the desired adhesive temperature. However, the adhesive is likely to char or otherwise degrade under these conditions. This char acts as an insulating layer and degrades the melting performance. It is also likely to break off and clog downstream elements of the system. In addition, degraded adhesive may not provide the bonding performance required by the application. For these reasons, it is desired that the adhesive closely approach the set point temperature of the reservoir, hoses, and applicator heads, and that strong temperature gradients and associated hot spots be avoided. Prior melting units were either relatively small, in which case the residence time in the hoses was sufficient to bring the adhesive up to temperature, or a separate heat exchanger was required between the pump and the hoses. The heat exchanger used the pump pressure to overcome the drag caused by the extensive surface area, but this is relatively expensive as it requires a separate heating zone and an additional high pressure component.

One melting grid which achieves certain advantages in optimizing the above parameters is disclosed in U.S. Pat. No. 5,657,904, which is owned by the assignee of the present invention. The disclosure of U.S. Pat. No. 5,657,904 is hereby fully incorporated herein by reference. This patent discloses a melting grid having intersecting sets of high and low level grid members and certain other unique features which help achieve a balance between melt rate and flow rate. Advances and improvements in this area are nevertheless desirable.

In view of the various problems in this field, it would be desirable to provide a thermoplastic material melting unit in which the melting rate, liquid throughput or flow rate, and overall heat transfer are optimized.

SUMMARY OF THE INVENTION

The present invention provides a thermoplastic material melting unit including a supply hopper having an interior space for receiving solid thermoplastic material, a liquid reservoir disposed beneath the interior space of the supply hopper and also including an interior space generally defined by side walls and a bottom wall. The reservoir includes an outlet for discharging melted thermoplastic material and a plurality of heat exchanging elements disposed within reservoir and extending generally in an upward direction relative to the bottom wall of the reservoir. A melting grid is disposed between the supply hopper and the reservoir and includes a plurality of intersecting elongated grid members including a plurality of upwardly extending grid members for contacting and melting the solid thermoplastic material and a plurality of downwardly extending grid members which intermesh with the upwardly extending heat exchanging elements disposed in the liquid reservoir to occupy the interior space of the reservoir. At least one heating element is thermally coupled to the melting grid and to the plurality of heat exchanging elements disposed in the reservoir.

One of the novel aspects of this invention is the intermeshing of the grid members and reservoir heat exchanging elements to greatly increase the surface area available for heat exchange without introducing excessive resistance to the flow of the molten adhesive through the unit. This is possible because the viscosity of the adhesive drops dramatically with increasing temperature. In this regard, solid adhesive will tend to "plug flow" with a thin layer of hot adhesive at low viscosity lubricating the walls of grid members as the adhesive moves through the grid. In the past, extensive surface area in an area where gravity head is the only driving force for fluid flow (i.e., upstream of the pumps) has been avoided to maximize throughput. In other words, extensive surface area in a grid was believed to be detrimental to throughput because of anticipated plugging. In developing the invention, among various findings, it was found that the initial grid fins may be placed closer together than generally thought feasible in the past while achieving adequate throughput. In this regard, spacing the fins more closely and lengthening the resulting restricted and heated flow path dramatically increased the adhesive temperature leaving the grid. Against conventional wisdom, the overall throughput penalty for this close spacing was small. In addition, the adhesive viscosity was much less, allowing even more surface area for heat exchange than in prior art devices. This relatively lower viscosity also allows more opportunity to split and redirect the adhesive so that the "plug flow" can be broken up, and the adhesive can be raised to a uniformly high temperature, despite its very low thermal conductivity.

An important consideration in this design is the presence of a thermal boundary layer. This is the thin lubricating layer of molten adhesive. Computational fluid dynamics (CFD) evaluations of several fin geometries showed that the thickness of this layer varies from about 0.02 mm at the fin tips to 5 mm or more at the fin base. Therefore, spacing the fins so that the "throat" or closest points between fins are about 3–8 mm apart provides excellent opportunity for heat transfer without excessive flow resistance.

The grid members of the melting grid and the heating elements disposed in the reservoir preferably comprise fins which taper in thickness toward the outer edges thereof. Also in the preferred embodiment, the melting grid preferably has both a set of high level grid members and a set of lower level grid members or fins extending upwardly to initially heat, slice and melt the solid thermoplastic material.

In another embodiment of the invention, a plurality of sets of heating elements are superimposed or stacked upon one another to provide a combined a melting grid and a heat exchange section of a melting unit. More specifically, serpentine-shaped electrical heating elements are disposed in vertically spaced relation with an upper heating element serving as a primary melting element and lower heating elements serving as secondary melting elements and heat transfer elements to raise the temperature of the melted thermoplastic material to a desired set point within a reservoir. In this embodiment, the serpentine-shaped heating elements are preferably oriented in vertically spaced relation and with the elements of adjacent grids oriented perpendicularly or transversely to each other. Also, the heating elements in the middle section of a particular grid are more closely spaced together than the heating elements at outer portions thereof.

In another embodiment, grids are formed with a plurality of elongated heating elements carrying a plurality of thin, flat fins. These fins are oriented at an angle relative to the axis of each heating element and serve to transfer heat from the heating elements to the thermoplastic material. These grids are stacked with the fins and heating elements of adjacent grids being oriented perpendicularly or generally transverse to each other. This results in forming multiple flow paths and increased surface area contact with heated surfaces as solid thermoplastic material is melted and heated by the stacked grids.

Another embodiment of the invention utilizes one or more grids formed by fins having electrical heating elements contained therein and further including generally vertically oriented slots for providing increased flow paths and increased heated surface area. These fins may be tapered and formed into various types of grids and heat exchange devices for disposition within a thermoplastic material melting unit. The invention further contemplates methods which may be carried out using the various devices disclosed herein. For example, a method in accordance with this invention may include introducing solid hot melt adhesive onto a plurality of first elongated fins of a melting grid, with the first fins being both heated and tapered to initially heat, slice and at least partially melt the solid hot melt adhesive. Hot melt adhesive is then passed into a plurality of elongated channels extending lengthwise along the first elongated fins and further passed into a plurality of second elongated fins which intersect the first elongated fins. The second elongated fins are also heated and tapered to again heat and slice the hot melt adhesive in a direction transverse to the first elongated fins. The hot melt adhesive is then passed through passages contained between the intersecting first and second elongated fins and, finally, the method involves contacting the hot melt adhesive with a plurality of third elongated and heated fins extending from the melting grid below the first and second elongated fins to transfer additional heat to the hot melt adhesive.

It will be appreciated that additional methods involving the various embodiments of this invention as well as various modifications and substitutions of components in various embodiments are contemplated by this invention. From the foregoing summary and the description to follow, it will be appreciated that the various forms of this invention optimize the various parameters, including melt rate, flow rate and heat transfer involved with melting and dispensing thermoplastic material, such as hot melt adhesive. Additional advantages and objectives of the invention will become more readily apparent to those of ordinary skill upon review of the following detailed description of the various embodiments, taken in conjunction with the accompanying drawings.

DETAILED DESCRIPTION OF THE PREFERRED EMBODIMENTS

Figure 1:
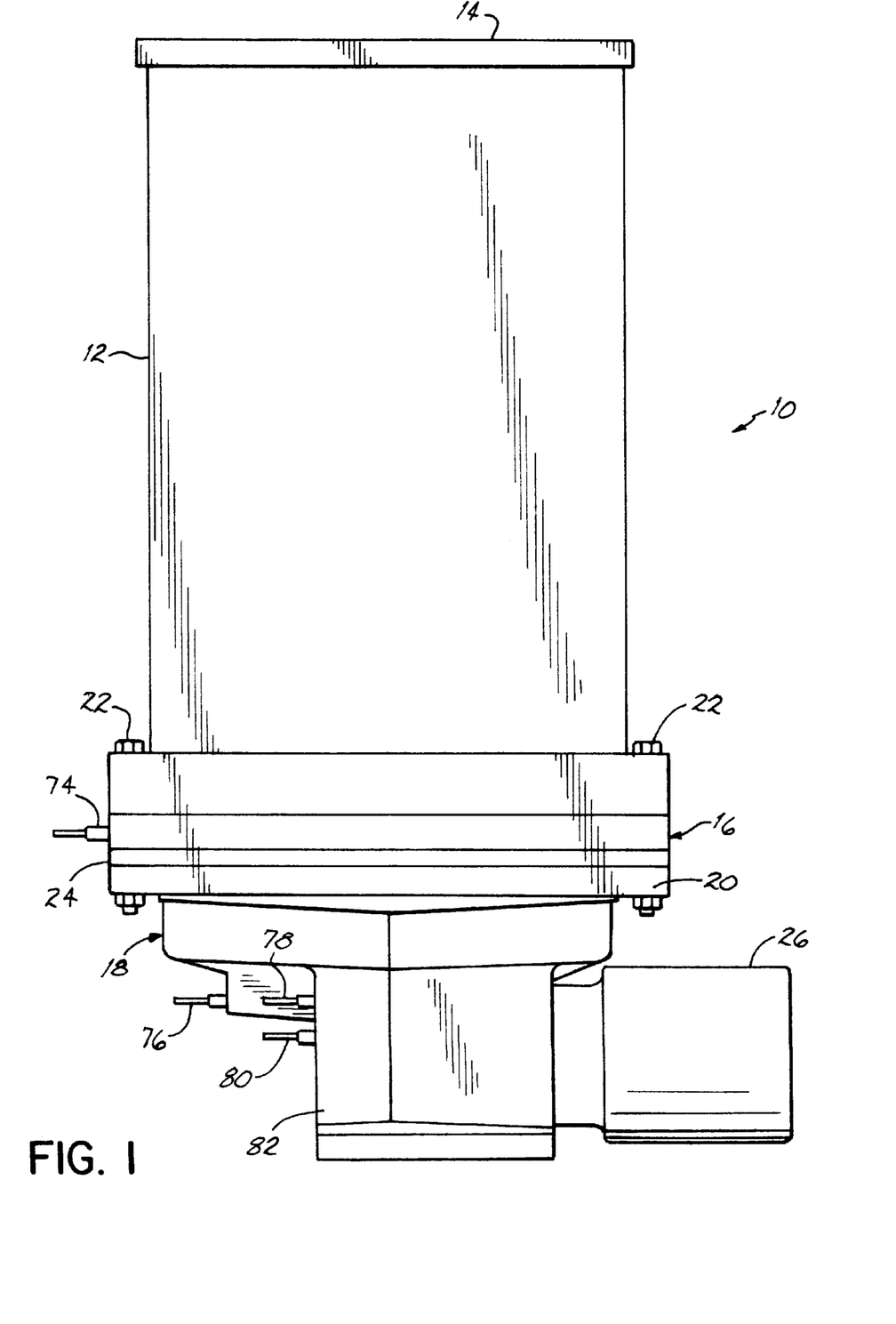
FIG. 1 is a side elevational view of a thermoplastic material melting unit constructed in accordance with a preferred embodiment of the invention.

Referring first to FIG. 1, a thermoplastic material melting unit 10 is shown in connection for use with one preferred embodiment of the present invention. Various conventional components and accessories have been excluded from FIG. 1, as these are not necessary to an understanding of the present invention. It will be understood that melting unit 10 may be used in various capacities for melting different types of thermoplastic material, however, it is especially useful for melting solid hot melt adhesive material. A supply hopper 12 is provided for holding a supply of solid hot melt adhesive material which may be introduced by opening a hinged lid 14. As is known, hot melt adhesive material may be supplied in various forms including those mentioned hereinabove. In accordance with the invention, melting unit 10 includes a melting grid 16 and a reservoir 18 for containing melted liquid hot melt adhesive. Melting grid 16 and reservoir 18 are described in more detail below. Reservoir 18 includes an upper flange 20 which is fastened to supply hopper 12, for example, with melting grid 16 held therebetween. A ring or annular member 24 formed from a thermally insulating material may also be provided, as shown, to thermally isolate upper and lower regions of unit 10. All of these elements are securely fastened by means of fastening bolts 22. Finally, one or more conventional pumps 26 may be provided and connected to reservoir 18 for pumping liquid hot melt adhesive to various dispensers, for example, in accordance with the application needs.

Figure 2:
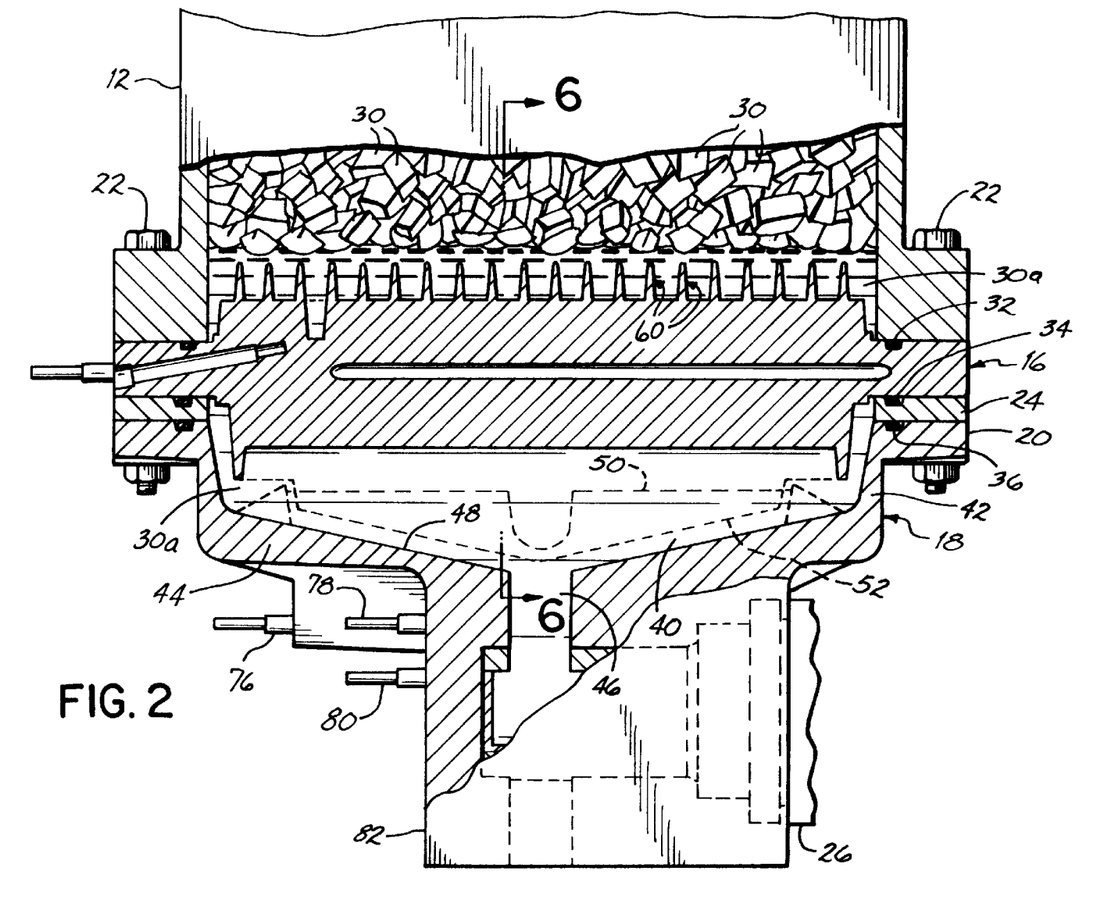
FIG. 2 is an enlarged side elevational view of a lower end of the unit shown in FIG. 1, partially in cross section to show details of the melting grid and reservoir sections.

FIG. 2 illustrates a melting grid 16 in more detail as well as the interaction between melting grid 16 and reservoir 18. As further shown in FIG. 2, solid chunks 30 of hot melt adhesive material are contained within supply hopper 12 and rest against melting grid 16. Melting grid 16 heats and melts chunks 30 into a liquid 30a which travels through melting grid 16 into reservoir 18. To seal the various components, as shown in FIG. 2, gaskets 32, 34, 36 are provided between supply hopper 12, grid 16, spacer 24 and flange 20 of reservoir 18. As mentioned, reservoir 18 includes an interior space 40 defined generally between surrounding side walls 42 and a bottom wall 44. Bottom wall 44 further includes at least one discharge outlet 46 leading to pump 26. A bottom surface 48 of reservoir 18 is sloped toward discharge outlet 46 to promote full drainage of liquid hot melt adhesive 30a. A plurality of fins 50 project upwardly from bottom surface 48 and intermesh with a set of fins 52 which extend downward from melting grid 16. As will be described in more detail below, melting grid 16 further includes a set of fins 60 extending upwardly to contact and melt solid adhesive chunks 30 or other forms of adhesive material.

Figure 3:
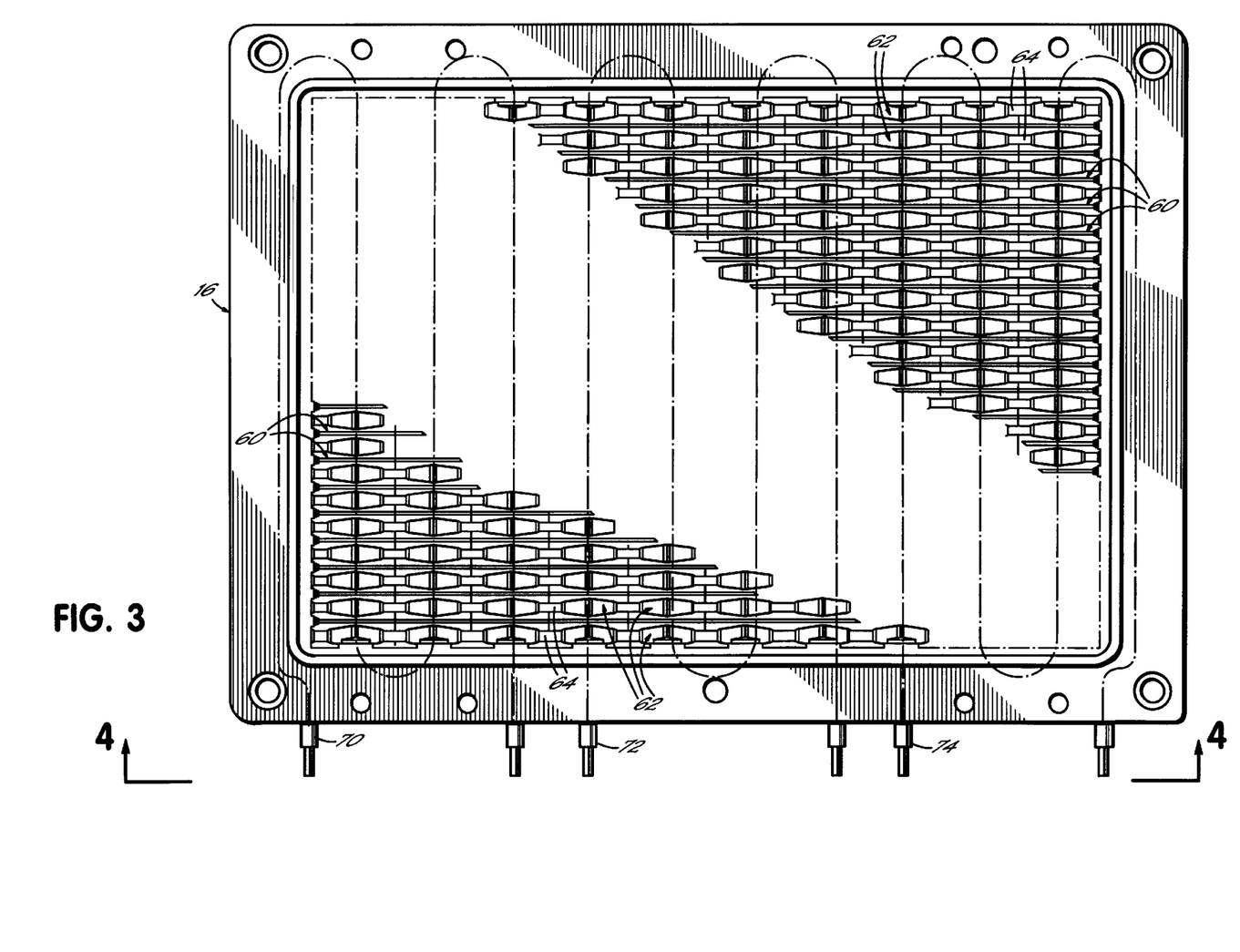
FIG. 3 is a top view of the melting grid shown in FIG. 2.
Figure 4:
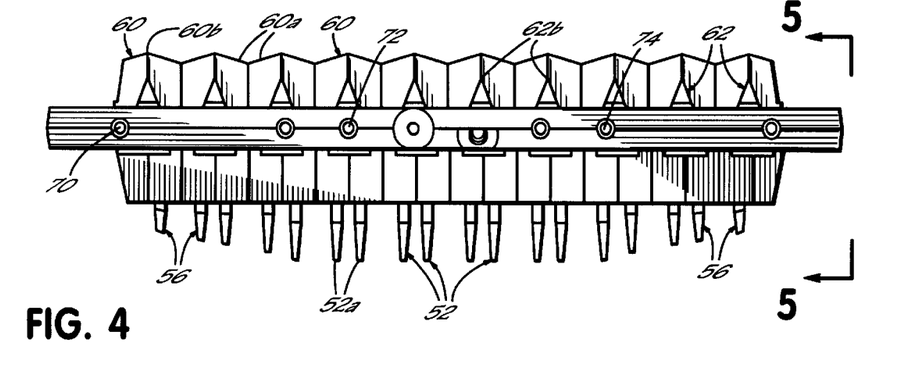
FIG. 4 is a front elevational view of the melting grid taken along line 4—4 of FIG. 3.
Figures 5, 12:
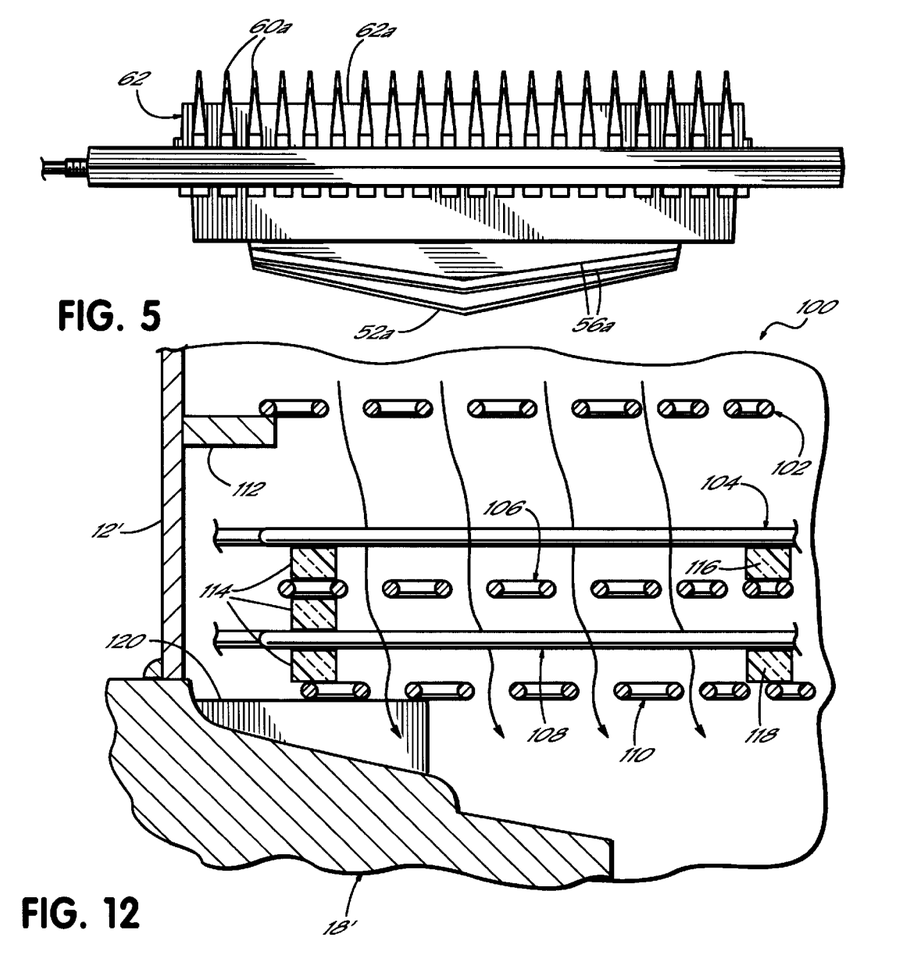
FIG. 5 is a side elevational view of the melting grid taken along line 5—5 of FIG. 4.
FIG. 12 is a cross sectional view of the arrangement shown in FIG. 11, and generally taken along line 12—12 thereof, but showing the melting grid and heat exchanger arrangement disposed within a thermoplastic material melting unit.

The construction of melting grid 16 is best understood from a review of FIGS. 3–5. Melting grid 16 is preferably cast from aluminum and, as will be appreciated, is formed to have a significantly increased heated surface area as compared to past grids used for similar purposes. As further understood from a review of FIGS. 3–5, fins 60 comprise an upper level or high level of fins extending above a second set of lower level fins 62. Fins 60 and 62 intersect in perpendicular fashion to form an array of through passages 64 as best shown in FIG. 3. As further shown in FIG. 4, high level fins 60 preferably each have a serrated leading edge 60a which forms a plurality of apexes or points 60b. This not only increases the contact area by increasing the effective length of leading edge 60a, but also produces high pressure points 60b for better penetrating into chunks 30 or other forms of solid hot melt adhesive (FIG. 2). As also appreciated from FIGS. 4 and 5, leading edges 62b of lower level fins 62 are disposed below leading edges 60a. Finally, as also shown in FIGS. 4 and 5, fins 52, which extend downward relative to fins 60 and 62, may vary in height so that they follow generally the contour of reservoir 18. This can include, as shown, outer sets of fins 54, 56 which are of shorter length than inner sets of fins 52 and also include a varying height to the respective fins themselves as shown by trailing edges 52a, 56a in FIG. 5. Such features ensure that fins 52, 54, 56, taken together with fins 50 of reservoir 18 (FIG. 2) occupy a substantial portion of interior space 40 associated with reservoir 18.

Figure 6:
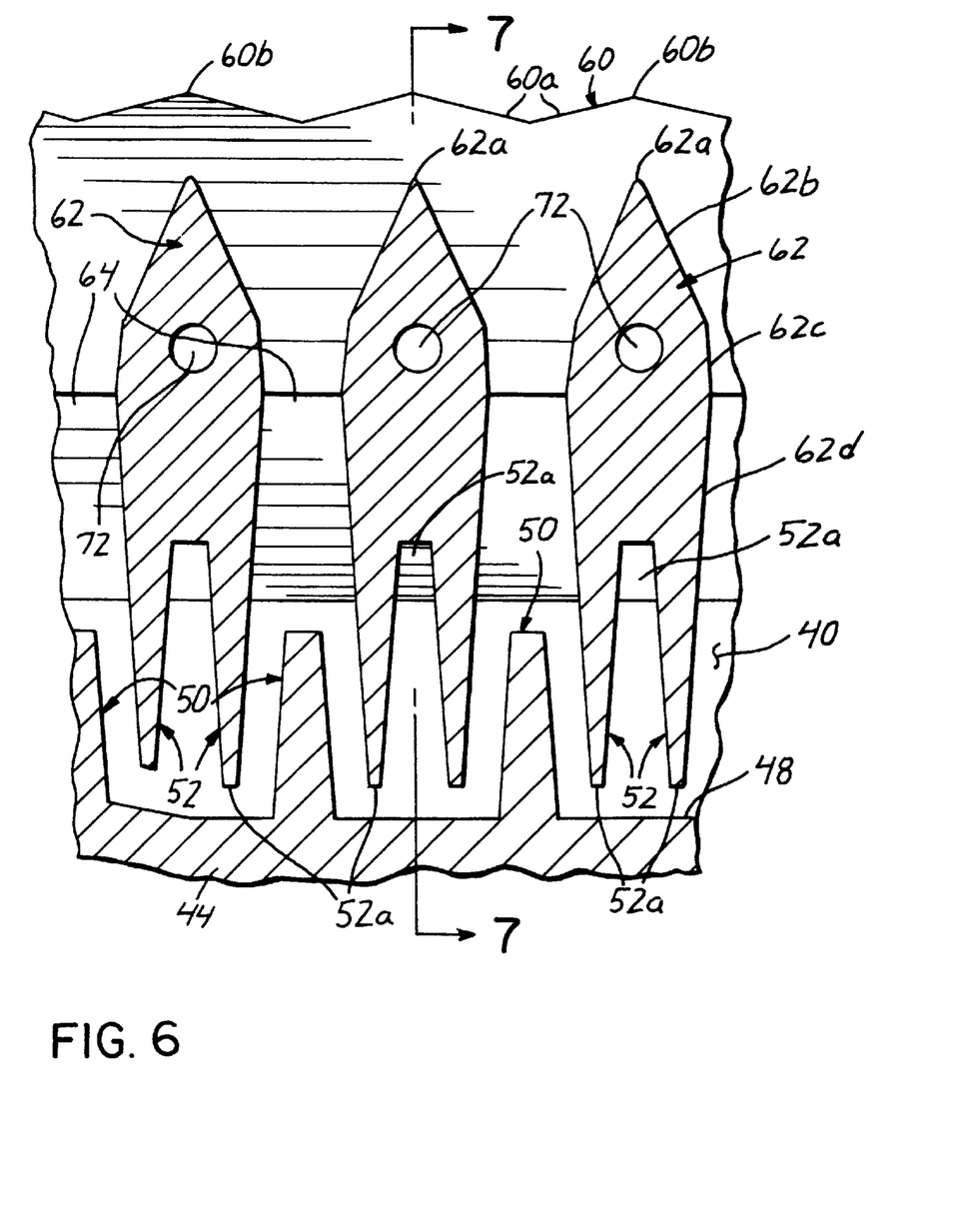
FIG. 6 is a cross sectional view, partially fragmented, and taken along line 6—6 of FIG. 2.

As best shown in FIG. 3, a plurality of electrical heating elements 70, 72, 74 are also inserted are cast within melting grid 16 in a serpentine fashion. Associated resistive temperature detectors (RTD's, not shown) are also inserted into holes (not shown) drilled in grid 16 in a conventional manner for controlling the temperature of grid 16. In particular, heating elements 70 are cast within lower level fins 62 as shown in FIG. 6. As further shown in FIG. 2, additional heating elements 76, 78, 80 may be embedded into additional downstream portions of melting unit 10, including reservoir 18 and other manifold structure 82 associated with pump 26.

Figure 7:
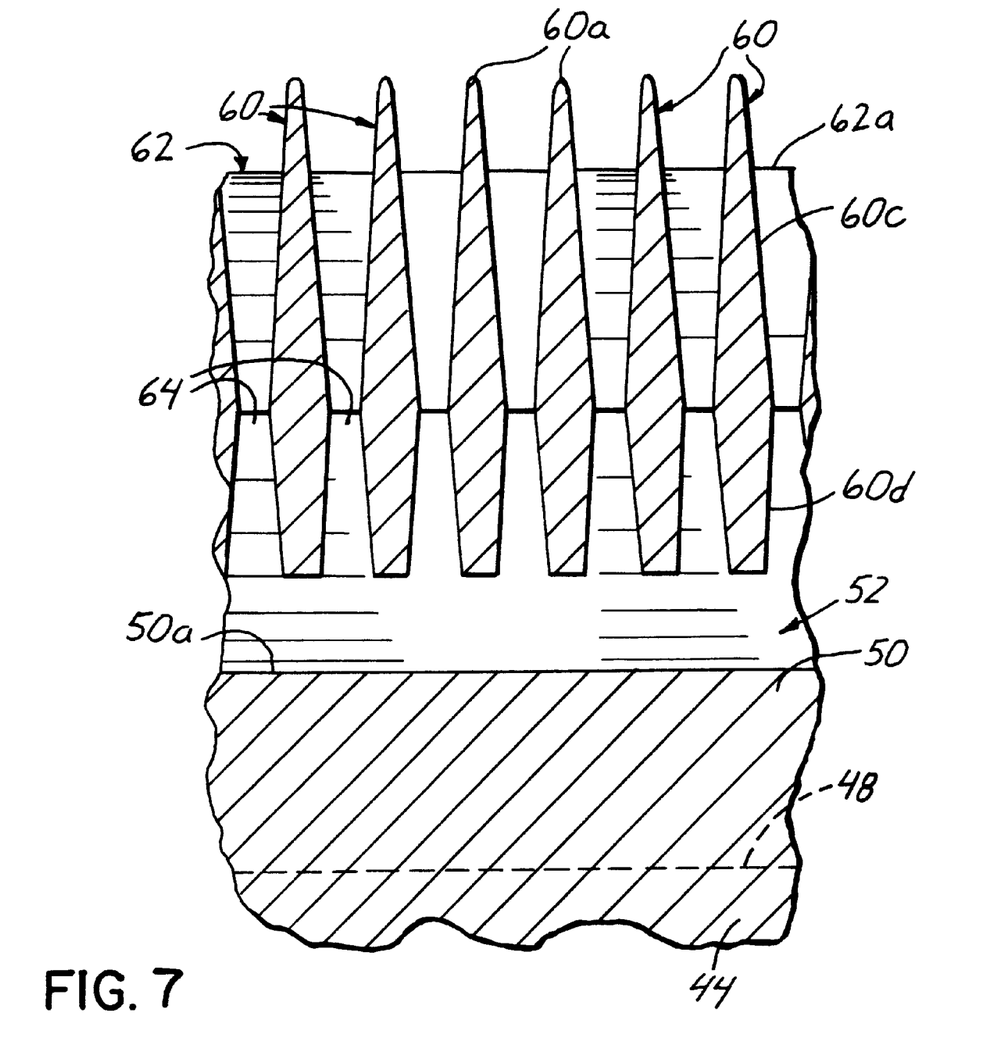
FIG. 7 is a cross sectional view, partially fragmented, and taken along line 7—7 of FIG. 6.

FIGS. 6 and 7 illustrate the construction of melting grid 16 in more detail. In particular, it will be noted that lower level fins 62 have lower ends which are extended to form downwardly directed fins 52. Specifically, two fins 52 extend from each lower level fins 62 and taper to trailing edges 52a. Fins 52 are situated between pairs of adjacent fins 50 extending upwardly from bottom surface 48 of reservoir 18. This pair of fins 52 traps an air pocket 52a. This air pocket allows for the thermal expansion of the adhesive when the unit is started cold with solidified adhesive in the reservoir area. This concept is further described in U.S. Pat. No. 4,771,920, assigned to the assignee of this invention. Fins 50 also preferably taper upwardly to leading edges 50a. Leading edges 50a are disposed above trailing edges 52a to assure that liquid contained in space 40 is located in close proximity to a heated surface. Through a comparison of FIGS. 6 and 7, it will be noted that high level fins 60 taper upwardly at a smaller angle than low level fins 62. As discussed with respect to FIG. 4, fins 60 have a leading edge 60a with apexes 60b creating a serrated top surface and further having two angled outer surfaces 60c, 60d (FIG. 7). Most preferably, the respective angles of surfaces 60c, 60d relative to vertical are about 4° and about 3°. Likewise, fins 62 have a leading edge 62a and three angled side surfaces 62b, 62c, 62d. The respective angle of surfaces 62b, 62c, 62d relative to vertical are about 22°, 4° and 4°. The specific angles may vary, however, it is advantageous to have the significant difference in angular relationship between surfaces 60c and 62b. For example, the angle of surface 60c may vary between about 3° and about 10°, while the angle of surface 62b may vary between about 10° and about 30°. With the intersecting grid member design of this invention, a relatively small throat area 64 is provided for allowing adhesive to flow through grid 16 while becoming well heated in the process. In this specific embodiment, throat area 64 is rectangular-shaped and about 5 mm×18 mm at its smallest area. It is believed that these dimensions may be variable to a range of about 3–8 mm×10–30 mm for grids constructed similar to grid 16. With the preferred grid 16 and reservoir 18, for example, it may be ensured that all liquid contained in space 40 is located at an approximate maximum distance of between about 3–8 mm from the nearest heated surface. This ensures quick heating, uniform heating and minimal degradation of the liquid hot melt adhesive 30a, as well as quicker start-up due to a smaller overall space in which solid hot melt adhesive can accumulate after melting unit 10 is shut down and allowed to cool.

Figure 8:
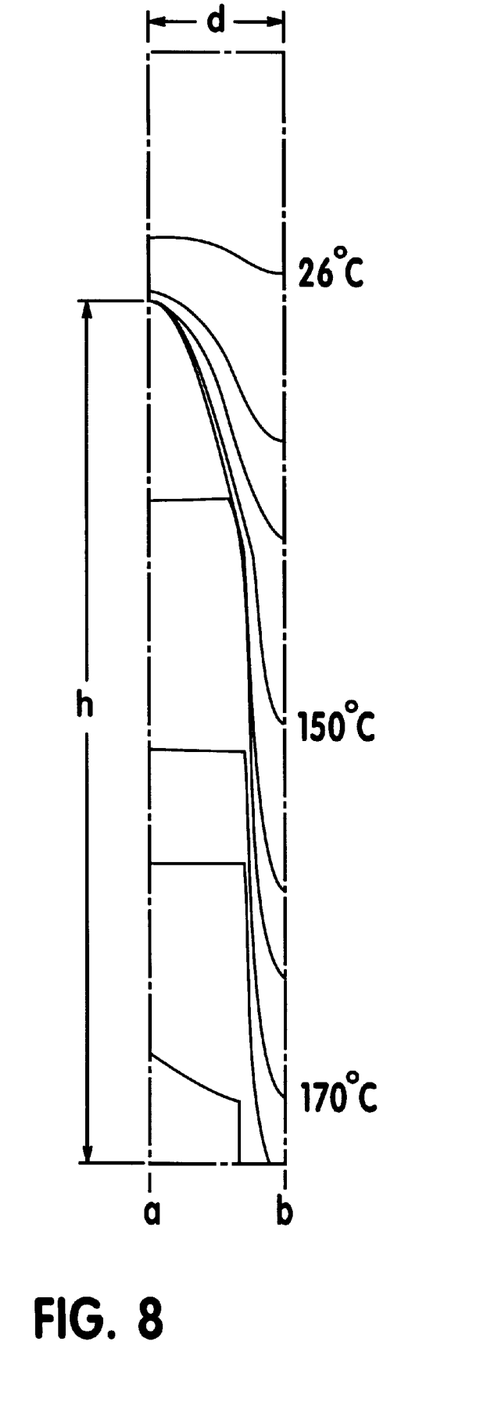
FIG. 8 is a graphical representation of a CFD evaluation representing results of a close fin spacing.
Figure 9:
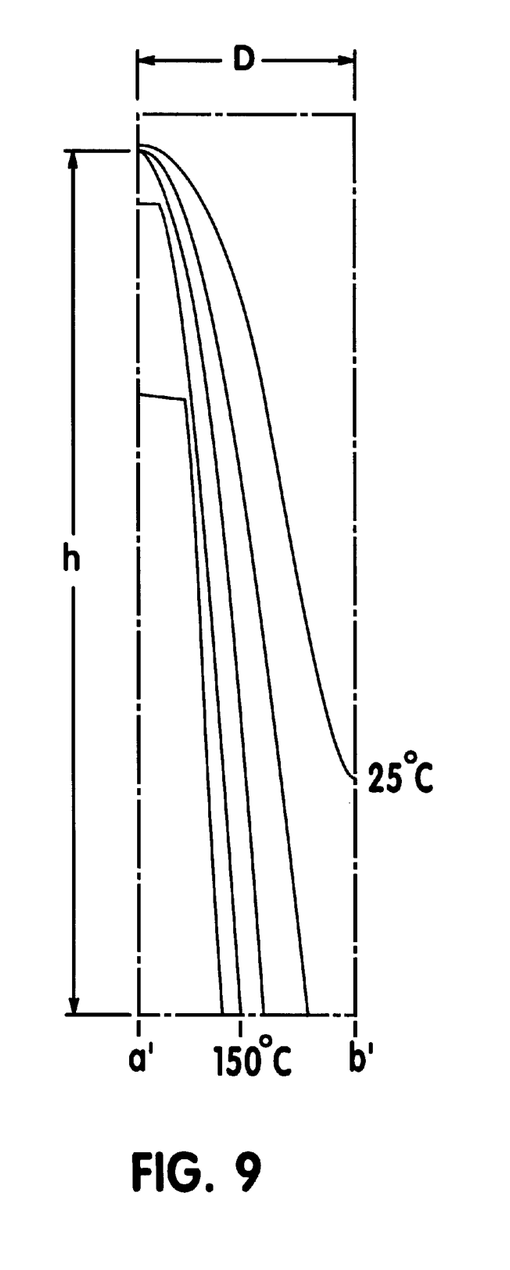
FIG. 9 is a graphical representation of a CFD evaluation of another fin geometry having a larger fin spacing than that represented in FIG. 8.

FIGS. 8 and 9 schematically illustrate graphs which represent CFD (computational fluid dynamics) evaluations of two different fin geometries used to melt the same hot melt material. FIG. 8 illustrates a CFD model or graphical representation of a fin structure having a height "h" of about 90 mm and represented in a grid where the distance between the center line "a" of the fin and the center line "b" of the throat is a distance "d" which, in this case, is approximately 13.8 mm. The line at 150° C. represents the approximate location of the thermal boundary layer. This layer extends a significant distance above the bottom of the throat. It will also be noted that the colder layers do not extend a significant distance into the throat area. On the other hand, FIG. 9 illustrates a model in which the height "h" of the fin is likewise about 90 mm, but a dramatic difference is shown. Here, the distance "D" between the center line a' of the fin and the center line b' of the throat is larger at about 22 mm. Comparing the relative sizes of the throats, FIG. 9 represents a fin and throat structure wherein the distance between the center line "b" of the throat and a lower adjacent surface of the fin is approximately 14.3 mm while FIG. 8 illustrates a fin and throat configuration in which the distance between the center line b' and the lower adjacent surface of the fin is approximately 4.6 mm. It will be readily appreciated that the larger throat size of FIG. 9 allows the colder temperature layers to drop much farther into the throat area. In this illustration, the approximate thermal boundary layer of 150° C. is located closely adjacent to the bottom of the fin. For each model, as represented in FIGS. 8 and 9, the downward flow rate of material is about 0.028 cm/sec.

Figure 10:
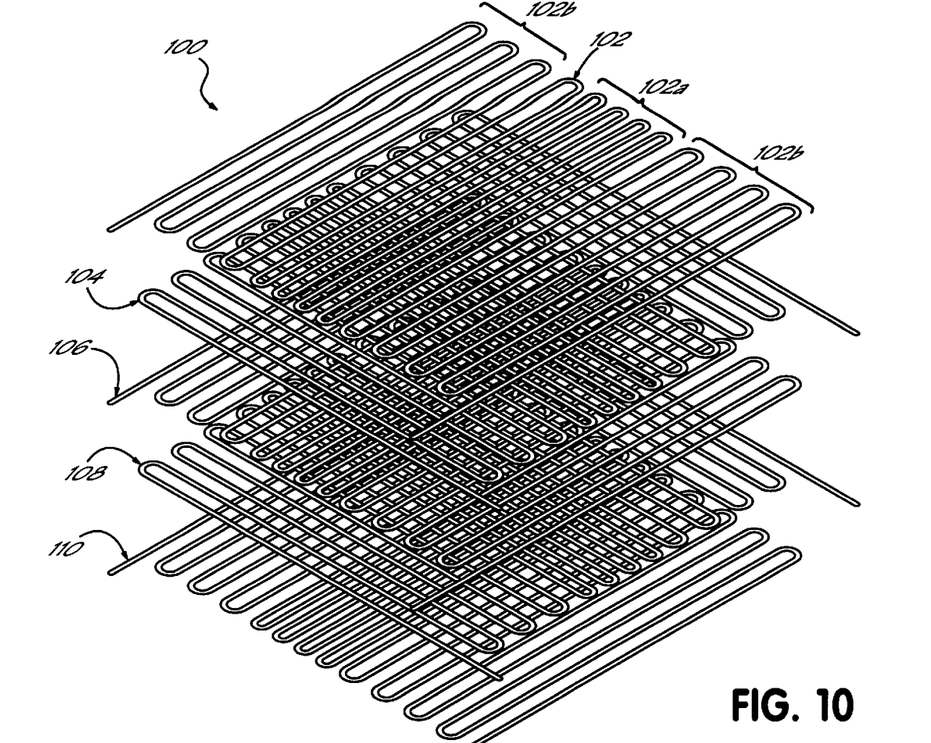
FIG. 10 is a perspective view of an alternative melting grid and heat exchanger arrangement for use in a thermoplastic material melting unit.
Figure 11:
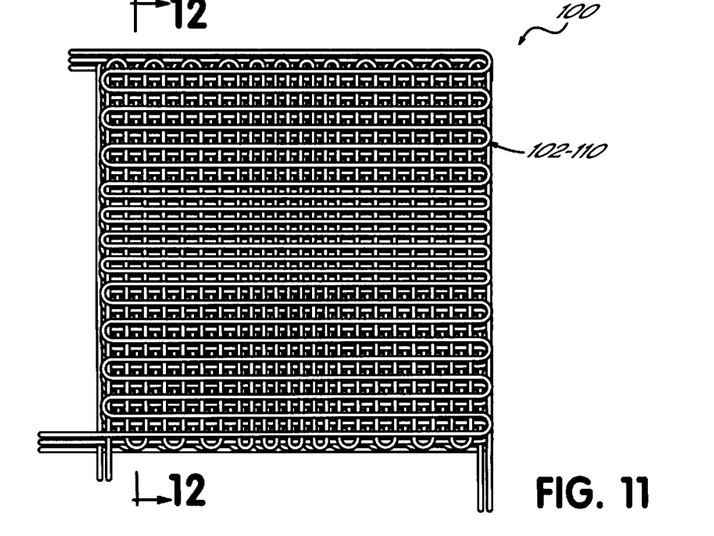
FIG. 11 is a top view of the melting grid and heat exchanger arrangement shown in FIG. 10.

FIGS. 10–12 illustrate one alternative grid and heat exchanger device using bare electric heating element arrays 102, 104, 106, 108, 110 formed, for example, in a serpentine fashion as shown. As also shown best in FIG. 10, adjacent elements are oriented perpendicularly or at least transverse to one another. As viewed in FIG. 11, this ensures that contact between adhesive flowing through device 100 and heating element arrays 102–110 is maximized. In other words, a net or grid of bare heating elements is formed to maximize heat transfer to the melting and melted adhesive. As further shown in FIG. 10, inner portions of each heating element arrays 102–110 may be more closely spaced than outer portions thereof. For example, portions 102a are more closely spaced than outer portions 102b. This may equalize flow in the center of each array 102–110 in relation to the outer portions of each array 102–110. To offset the additional heating elements in the center in relation to the outer portions, the watt density may be less in the center than in the outer portions.

As further shown in FIG. 12, heating element array 102 may be used as an initial melter and positioned at the lower end of a hopper 12' for example, mounted on a suitable support 112. This array 102 then acts as a gate to allow adhesive into the lower heat exchanger section formed by heating element arrays 104–110. In this manner, heating element array 102 can quickly melt solid adhesive and this melted adhesive will fall into the heat exchanger section formed by heating element arrays 104–110. These arrays 104–110 may then act to raise the liquid adhesive to the desired set point temperature. Heating element arrays 104, 110 may be spaced apart by suitable spacers 114 and a plurality of resistive temperature detectors (RTDs) 116 and 118 may be placed in contact with heating element arrays 104–110 as shown to indicate the temperature thereof to a conventional control. Arrays 104–110 may be mounted on an upper surface or mounting portion 120 of a reservoir 18' connected at a lower end of supply hopper 12'. Reservoir 18' may include a suitable electrical heating devices and fins (not shown) as well as sloped drainage surfaces and one or more discharge outlets as previously described in connection with the first embodiment. Device 100 may have various advantages including a high relative melt rate, a low overall mass for quick warm-up and cool-down, accurate control of fluid temperature, high efficiency due to direct contact between the adhesive and the heating elements and a relatively low average distance between the adhesive and the heated surfaces.

Figure 13:
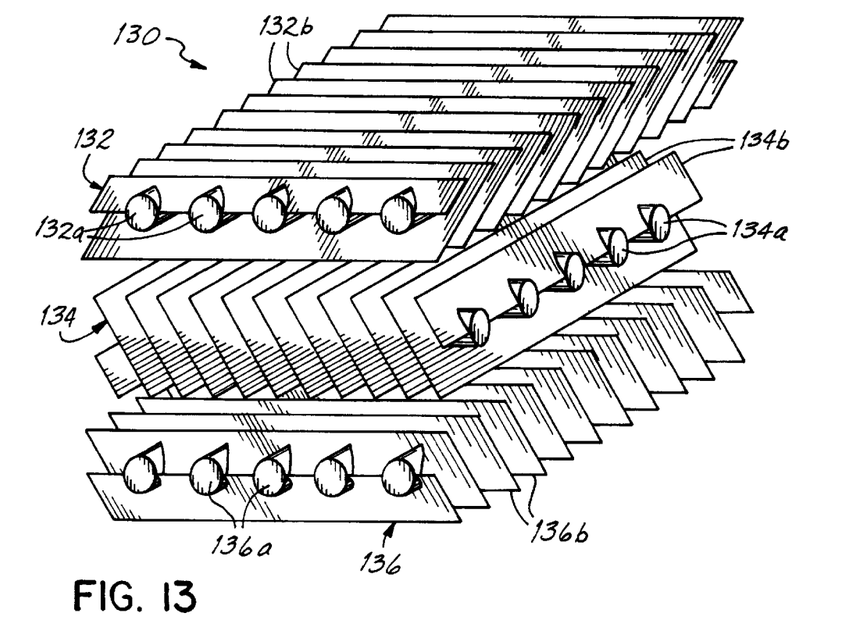
FIG. 13 is a perspective view of another alternative melting grid and heat exchanger arrangement for use in a thermoplastic material melting unit.
Figure 14:
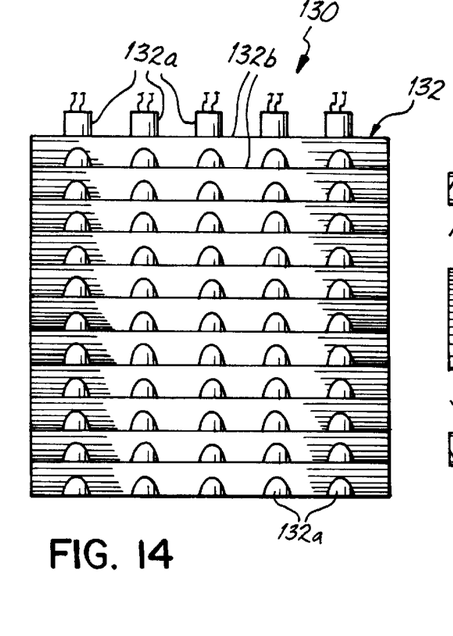
FIG. 14 is a top view of the melting grid and heat exchanger arrangement shown in FIG. 13.
Figure 15:
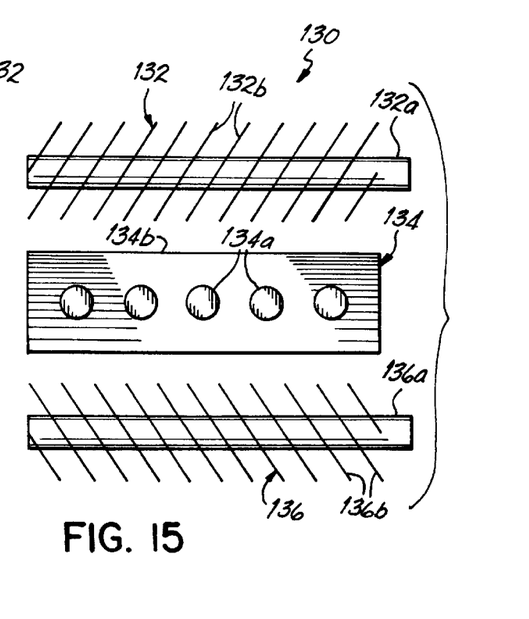
FIG. 15 is a side elevational view of the melting grid and heat exchanger arrangement shown in FIG. 13.

FIGS. 13–15 illustrate yet another embodiment generally incorporating concepts of the present invention. This embodiment is similar to the embodiment described immediately above, except that a multi-layered finned grid 130 is formed by a stacked arrangement of finned grids 132, 134, 136. The respective grids 132, 134, 136 are formed by electrical heating elements 132a, 134a, 136a holding a respective plurality of thin, angled fins 132b, 134b, 136b. Fins 132b, 134b, 136b are oriented perpendicular, or at least transverse to adjacent sets thereof as shown in FIGS. 13 and 15. The angle of fins 132b, 134b, 136b increases the surface area and residence time of adhesive in device 130. Heating elements 132a, 134a, 136a may be cast with fins 132b, 134b, 136b. Device 130 may be used within a hot melt adhesive melting unit such as generally described above and in conjunction with a reservoir (not shown) which may have additional heating elements and fin arrangements. Again, device 130 may be produced with a low overall mass for quick warm-up and may allow for precise control of liquid temperature or set point temperature. Finally, varying the fin angles effectively mixes the hot melt adhesive or thermoplastic material as it flows through the device to ensure more uniform liquid temperature.

Figure 16:
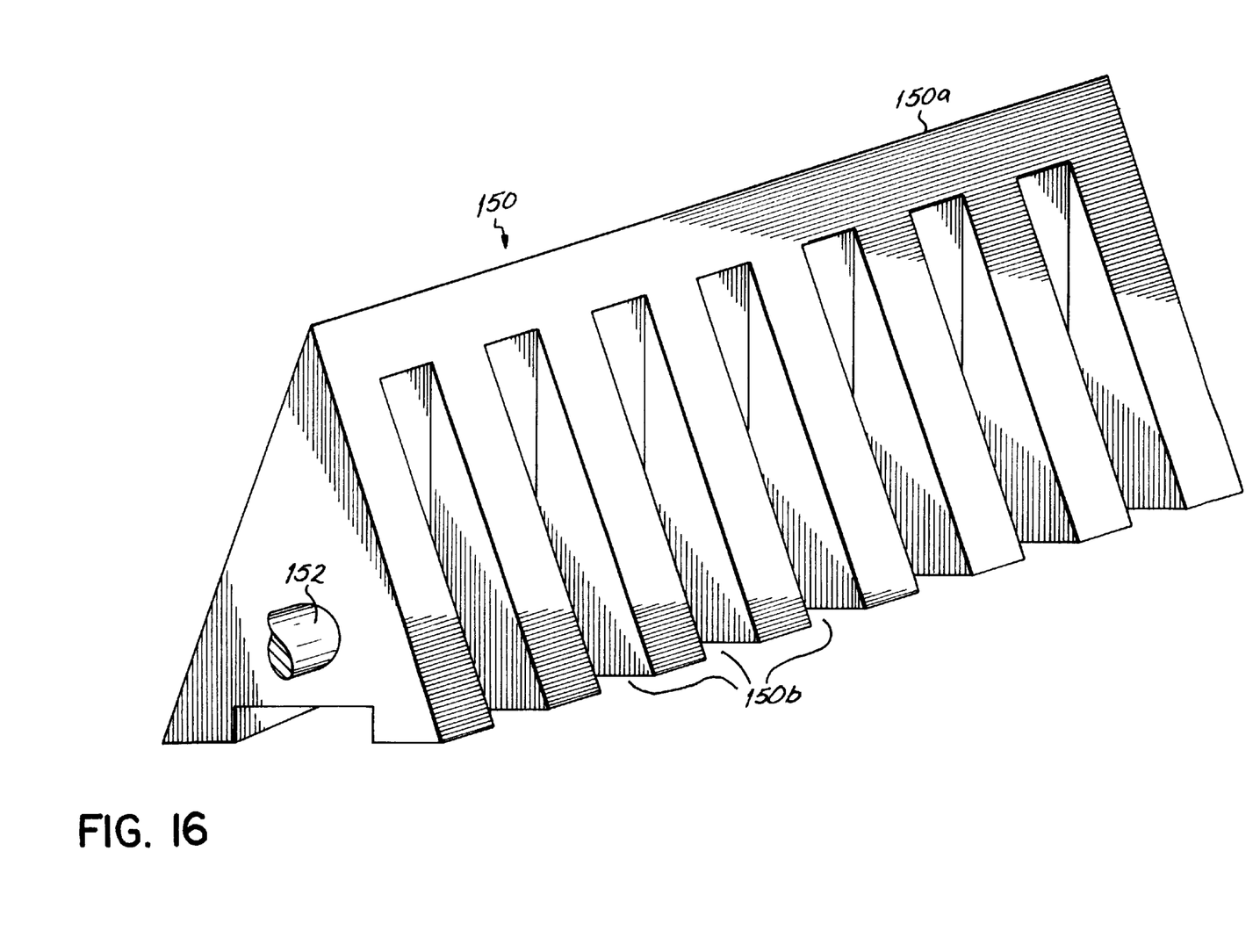
FIG. 16 is a perspective view of a fin and electrical heating element constructed in accordance with another embodiment of the invention.

FIG. 16 illustrates a perspective view of one alterative fin configuration useful in melting units, such as those of the present invention. This particular configuration is designed to provide a high melt rate via a high concentration of fins with a provision to allow easy removal of liquid adhesive. In particular, a slotted fin configuration may be used for increasing both heat transfer and liquid adhesive flow. As shown in FIG. 16, a tapered fin 150 may include an upper leading edge 150a and a series of generally vertically oriented slots 150b. As described above, fin 150 may be cast from aluminum and may include a resistive-type electric heating element 152 therein. Slots 150b both increase the surface area of fin 150 to increase heat transfer and, at the same time, provide multiple liquid flow paths past fin 150. It will further be appreciated that fin 150 may be tapered in upward and/or downward fashion, such as disclosed with respect to the first embodiment of this invention. It will be appreciated that the grid members and/or heat exchanging elements of the invention in its many forms may include the slotted fin design.

Figure 17:
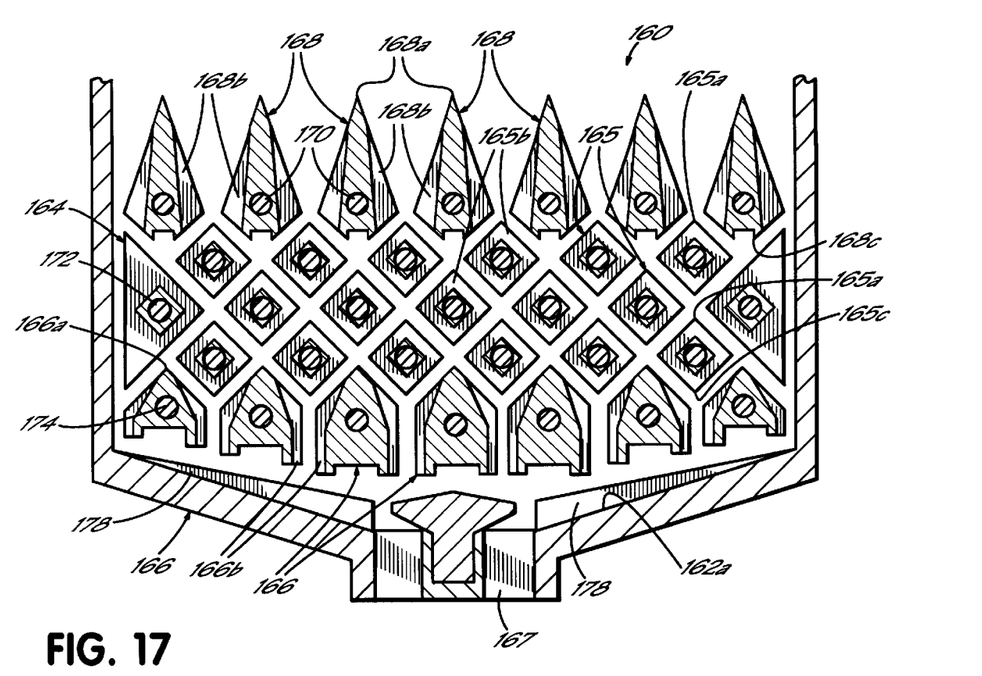
FIG. 17 is a side cross sectional view of a melting grid and heat exchanger arrangement disposed within a thermoplastic material melting unit with the fins being constructed in a manner generally corresponding to the fin illustrated in FIG. 16.

FIG. 17 shows one of many possible configurations of melting grids and heat exchangers using the slotted fin concept of FIG. 16 in a schematically represented melting unit. In particular, a melting grid 160 is schematically shown in cross section as contained within a melting unit 162, such as at the upper end of a reservoir associated therewith. A heat exchanger grid 164, also shown schematically in cross section, may be mounted below melting grid 160 and may comprise a plurality of grid members 165. An additional layer of grid members 166 may be provided as a final heat exchanger section. A discharge outlet 167 is conventionally provided for allowing liquid to be pumped or otherwise discharged from melting unit 162. Melting grid 160 includes a plurality of fins 168 which may intersect with additional fins (not shown). Fins 168 are preferably tapered as shown to include relatively sharp leading edges 168a and are formed with slots 168b along the length thereof as shown in FIG. 17 and as generally described above with respect to FIG. 16. Heat exchanger elements or grid members 165, 166 may likewise be formed with respective slots 165b, 166b in a similar manner and for similar purposes. In accordance with the inventive concepts disclosed herein, the grid levels can intermesh as shown. For example, grid members 165 may have leading edges 165a disposed above trailing edges 165c of the next higher set of grid members 165 or above the trailing edges 168c of fins 168. Likewise, grid members 166 can have leading edges disposed above trailing edges 165c of the lowest set of grid members 165. Of course, melting grid 160 can take on many configurations and may have different numbers of grid member or heat exchanger levels. Electrical heating elements 170, 172, 174 and associated resistive temperature detectors (RTD's, not shown) may be respectively cast within or otherwise thermally connected with grid members or heat exchanger elements 168, 165, 166 to heat and control the temperature of each of these elements individually. In a conventional manner, for example, a plurality of fins 178 may be provided along a bottom surface 162a for supplying additional heat to liquid hot melt adhesive prior to its discharge from outlet 167.

While the present invention has been illustrated by a description of various embodiments and while these embodiments have been described in considerable detail, it is not the intention of the Applicants to restrict or in any way limit the scope of the appended claims to such detail. Additional advantages and modifications will readily appear to those skilled in the art. The invention in its broader aspects is therefore not limited to the specific details, representative apparatus and methods as shown and described. This has been a description of the present invention, along with the preferred methods of practicing the present invention as currently known.

However, the invention itself should only be defined by the appended claims, wherein We claim:

1. A unit for melting thermoplastic material comprising:
   a melting grid for contacting and for melting the thermoplastic material;
   a reservoir for receiving the melted thermoplastic material from said melting grid;
   a plurality of elongated heat exchanging elements positioned within said reservoir and extending in an upward direction;
   said melting grid having a plurality of elongated grid members extending downwardly and intermeshing with said upwardly extending heat exchanging elements; and
   at least one heating element thermally coupled to said elongated grid members and said plurality of heat exchanging elements.

2. The unit of claim 1 further comprising a supply hopper for receiving the thermoplastic material and passing the thermoplastic material to said melting grid.

3. The melting unit of claim 2, wherein said heat exchanging elements and said downwardly extending grid members further comprise fins.

4. The melting unit of claim 3, wherein said fins have outer edges and taper in thickness toward said outer edges.

5. The melting unit of claim 1, wherein said reservoir further includes a bottom having a slope to promote drainage of said melted thermoplastic material and said plurality of downwardly extending grid members have varying height dimensions corresponding to the slope of said bottom wall.

6. The melting unit of claim 1, wherein the bottom wall of said reservoir is sloped in at least two directions and said grid members have varying height dimensions in each of said two directions so as to slope in a manner corresponding to the bottom wall of said reservoir.

7. The melting unit of claim 1, wherein said melting unit is cast from a metal and said at least one heating element is disposed within said melting grid.

8. The melting unit of claim 1, wherein separate heating elements are thermally coupled to the elongated grid members of said melting grid and the heat exchanging elements of said reservoir.

9. The melting unit of claim 1, wherein said elongated heat exchanging elements have slots extending transverse to lengthwise dimensions thereof.

10. The melting unit of claim 9, wherein said elongated grid members have slots extending transverse to lengthwise dimensions thereof.

11. The melting unit of claim 1, wherein at least some of said elongated grid members have slots extending transverse to lengthwise dimensions thereof.

12. A thermoplastic material melting unit having a multi-stage heating system, the melting unit comprising:
- a supply hopper for receiving solid thermoplastic material,
- a reservoir communicating with said supply hopper for discharging melted thermoplastic material,
- a melting grid connected with said supply hopper for passing the melted thermoplastic material to said reservoir, said melting grid including first, second and third sets of elongated fins, at least said first and second sets of elongated fins intersecting to form a grid structure having through passages, said first set of fins formed by a plurality of high level fins and said second set of fins formed by a plurality of low level fins, said high and low level fins having leading edges with the leading edges of said high level fins being disposed above the leading edges of said low level fins, and said third set of elongated fins having respective trailing edges disposed below said first and second sets of elongated fins,
- a first heater thermally coupled to said first, second and third sets of fins,
- a fourth set of fins disposed within said reservoir and extending in an upward direction, wherein fins in said fourth set of fins intermesh with fins in said third set of fins, and
- a second heater thermally coupled to said fourth set of fins.

13. The melting unit of claim 12, wherein heating elements are contained within said low level fins and said first and second sets of fins are in thermal contact with one another so as to transfer heat from said low level fins to said high level fins.

14. The melting unit of claim 13, wherein opposite side surfaces of said high level fins taper upwardly toward one another at a smaller angle relative to vertical than opposite side surfaces of said low level fins.

15. The melting unit of claim 12, wherein the leading edges of said high level fins are serrated to increase slicing and heating capacity thereof.

16. The melting unit of claim 12, wherein said low level fins are substantially parallel to each another and substantially parallel to said fourth set of fins.

17. The melting unit of claim 12, wherein said low level fins are oriented substantially perpendicular to said high level fins and substantially parallel to said low level fins.

18. The melting unit of claim 12, wherein opposite side surfaces of said high level fins converge upwardly at an angle of between about 3° and about 10° relative to vertical.

19. The melting unit of claim 18, wherein opposite side surfaces of said low level fins converge upwardly at an angle of between about 10° and about 30° relative to vertical.

20. The melting unit of claim 12, wherein the fins in said third set of fins taper toward the trailing edges thereof.

21. A method of melting solid hot melt adhesive comprising:
- heating and slicing said solid hot melt adhesive with a first set of elongated fins to at least partially melt said solid hot melt adhesive, heating and slicing the hot melt adhesive with a second set of elongated fins extending transverse to the first set of elongated fins,
- heating said hot melt adhesive with a third set of elongated fins extending downward below said first and second sets of elongated fins; and
- heating said hot melt adhesive with a fourth set of elongated fins which intermesh with said third set of elongated fins.

22. A melting grid for melting thermoplastic material, said melting grid comprising:
- first and second sets of elongated fins intersecting to form a grid structure having through passages between said intersecting fins, said first set of fins formed by a plurality of high level fins having leading edges and said second set of fins formed by a plurality of low level fins having leading edges, wherein the leading edges of said high level fins are serrated to increase slicing and heating capacity thereof and are disposed above the leading edges of said low level fins, and
- a third set of elongated fins having respective trailing edges disposed below said first and second sets of elongated fins.

23. The melting grid of claim 22, further comprising:
- at least one heater thermally coupled to said first, second and third sets of fins.

24. The melting grid of claim 23, wherein opposite side surfaces of said high level fins taper upwardly toward one another at a smaller angle relative to vertical than opposite side surfaces of said low level fins.

25. The melting grid of claim 22, wherein heating elements are contained within said low level fins and said first and second sets of fins are in thermal contact with one another so as to transfer heat from said low level fins to said high level fins.

26. The melting grid of claim 22, wherein said low level fins are substantially parallel to each another and substantially parallel to said third set of fins.

27. The melting grid of claim 22, wherein said low level fins are oriented substantially perpendicular to said high level fins and substantially parallel to said third set of fins.

* * * * *